United States Patent
Windeisen et al.

[11] Patent Number: 5,934,346
[45] Date of Patent: Aug. 10, 1999

[54] DEVICE FOR HORIZONTALLY MACHINING PANELS

[75] Inventors: Joachim Windeisen, Schwaebisch Gmuend; Wolfgang Schnabel, Moegglingen, both of Germany

[73] Assignees: Schenk Werkzeug und Maschinenbau GmbH, Waldstetten, Germany; Kunz GmbH & Co., Gschwend, Germany

[21] Appl. No.: 09/011,092

[22] PCT Filed: Jul. 27, 1996

[86] PCT No.: PCT/EP96/03321

§ 371 Date: Jan. 27, 1998

§ 102(e) Date: Jan. 27, 1998

[87] PCT Pub. No.: WO97/04918

PCT Pub. Date: Feb. 19, 1997

[30] Foreign Application Priority Data

Jul. 28, 1995 [DE] Germany .......................... 195 27 727

[51] Int. Cl.⁶ ....................................................... B27C 9/00
[52] U.S. Cl. ............................. 144/3.1; 83/471.3; 29/40; 29/48.5 R; 144/1.1; 144/134.1; 144/137; 144/367
[58] Field of Search .................................... 83/469, 471.1, 83/471.8; 29/26 A, 30, 40, 48.5 R, 48.5 A; 144/1.1, 3.1, 133.1, 134.1, 363, 367, 369

[56] References Cited

U.S. PATENT DOCUMENTS

| | | |
|---|---|---|
| 3,289,662 | 12/1966 | Garrison . |
| 4,574,670 | 3/1986 | Johnson . |
| 4,576,076 | 3/1986 | Pyle . |
| 4,688,612 | 8/1987 | Kessel ........................................ 144/3.1 |
| 5,341,551 | 8/1994 | Brown et al. ................................ 29/40 |

FOREIGN PATENT DOCUMENTS

| | | |
|---|---|---|
| 02 29 668 A2 | 7/1987 | European Pat. Off. . |
| 17 63 168 | 3/1958 | Germany . |
| 80 33 805 U1 | 12/1980 | Germany . |
| 36 16 922 A1 | 11/1987 | Germany . |
| 43 32 630 A1 | 3/1995 | Germany . |

*Primary Examiner*—W. Donald Bray
*Attorney, Agent, or Firm*—Nath & Associates; Gary M. Nath; Harold L. Novick

[57] ABSTRACT

Disclosed is a device for machining panels, in particular panels made of derived timber products, in and essentially horizontal position. The device has a sawing and/or milling jig with at least one saw blade and/or at least on milling cutter. The device is preferably fitted with a combined sawing/milling jig whose movements are controlled by computer using several parameters. The device can also have a preferably computer-controlled panel-holding rig, a suction device for removing machining residues, such as chips and dust, means for conveying the panel and/or cutouts out of the device following machining or means for lifting the machined panel.

27 Claims, 3 Drawing Sheets

DEVICE FOR HORIZONTALLY MACHINING PANELS

BACKGROUND OF THE INVENTION

1. Field of the Invention

The invention relates to a device for machining panels. More particularly, the invention relates to a device for machining wood-based material panels in a substantially horizontal position.

2. Description of the Prior Art

In the construction field there is a need for machining panels, such as wood-based material panels, effectively (i.e. with sufficient accuracy and speed). Where machining involves cutting the panel to size (i.e. making it available with the desired dimensions and cut-outs), it is not unusual for suction devices in horizontal machining, (i.e. with the panel located flat) to fail to satisfy the requirements on the effectiveness in machining. This drawback is especially evident when the suction device is a component of an overall system in which sufficient cut-to-size panels always need to be available for further working.

SUMMARY OF THE INVENTION

The invention is accordingly based on the object of providing a device which permits effective panel machining and obviates the aforementioned disadvantages. It is therefore an object of the invention not only to make it possible to furnish the panels with sufficient accuracy in as short a time as possible, but also to enable the device to be integrated in an overall system producing components of single panels fully and automatically.

In accordance with the invention a device for machining panels in a substantially horizontal position comprises a carousel for mounting machining tools wherein said carousel is capable of being rotated and tilted; a sawing device mountable to said carousel wherein said sawing device comprises at least one sawing tool; a shaping device mountable to said carousel wherein said shaping device comprises at least one shaping tool.

In order to facilitate rotation of the carousel the device further comprises a worm wheel surrounding said carousel; a worm shaft connected to said worm wheel; and a motor connected to said worm shaft wherein said rotatable position of said carousel is determined by said motor driving said worm shaft which engages said worm wheel so as to rotate said carousel.

Panels can be cut by either the sawing device or the shaping device.

In order to facilitate automation of the invention the movement of said sawing device or said shaping device can be controlled by a computer. The computer can be programmed using a Computer Aided Design (CAD) Program to control the movement of the sawing device or the shaping device. The movement of said sawing device or said shaping device can be defined by a system of coordinates with the first direction parallel to said panel being defined as an x direction, the second direction parallel to said panel and perpendicular to said x direction being defined as a y direction, and a third direction perpendicular to said panel being defined as a z direction; dictated by: a starting point of a cutting line which is an A parameter defined in said x direction and said y direction; an ending point of said cutting line which is an E parameter defined in said x direction and said y direction; and a point normal to said panel which is a z parameter defined in said x direction, said y direction, and said z direction. Another parameter T can be defined as a cutting depth perpendicular to said cutting line.

The device can further comprise a translation frame parallel to an xy plane defined by said panel wherein said sawing device or shaping device is capable of being moved along said translation frame parallel to said xy plane defined by said panel.

In order to provide more stability in the device the device can also have a supporting frame; a mounting frame connected to said supporting frame and defining a mounting surface; and said translation frame being connected to said supporting frame and being capable of being moved along said supporting frame. The mounting surface further comprises a plurality of line-type mounting elements. These mounting elements can be used for remounting panels having a large surface area squarely on said mounting surface and also has recesses for lifting and ejecting said panel to be machined.

In another embodiment a locating means for maintaining said panel in a fixed position is provided. The locating means further comprises a clamping beam extending along said mounting frame and capable of being moved in order to secure said panel. The locating means can further comprise a stop located across from said clamping beam for securing said panel.

In an alternate embodiment the device further comprises a suction exhaust means for removing machining debris produced during panel machining. The suction exhaust means is integrated within said translation frame and said supporting frame and further comprises a tubular adapter having a flattened rectangle cross-section being connected to said suction exhaust means between said translation frame and said supporting frame.

The devise can further comprise a tubular-type design element having a passage and being integrated to said supporting frame and extending at right angles with respect to said translation frame; and a tubular adapter connected to said tubular-type design element capable of moving within said passage. A sealing element can be provided between said translation frame and said supporting frame wherein said sealing element minimizes bleed from said exhaust means between the translation frame and the supporting frame. The sealing element in some cases can be a lip type sealing element.

In yet still another embodiment of the invention the device can comprise an extracting means for extracting said panels from said device after machining said panel. The extracting means are pin-type elements which are capable of being moved in a vertical direction in order to extract said panel from said device. These extracting means can be a row of pin-type elements located along said translation frame on a regular center spacing and can be used to lift said panel in an upward direction in order to extract said panel. The extracting means can be a plurality of pin-type elements capable of extending in a vertical direction relative to a panel to be machined. The extracting means can be located along said supporting frame or said mounting frame and are capable of extending through an xy plane of said mounting frame.

DETAILED DESCRIPTION

Figure 1:
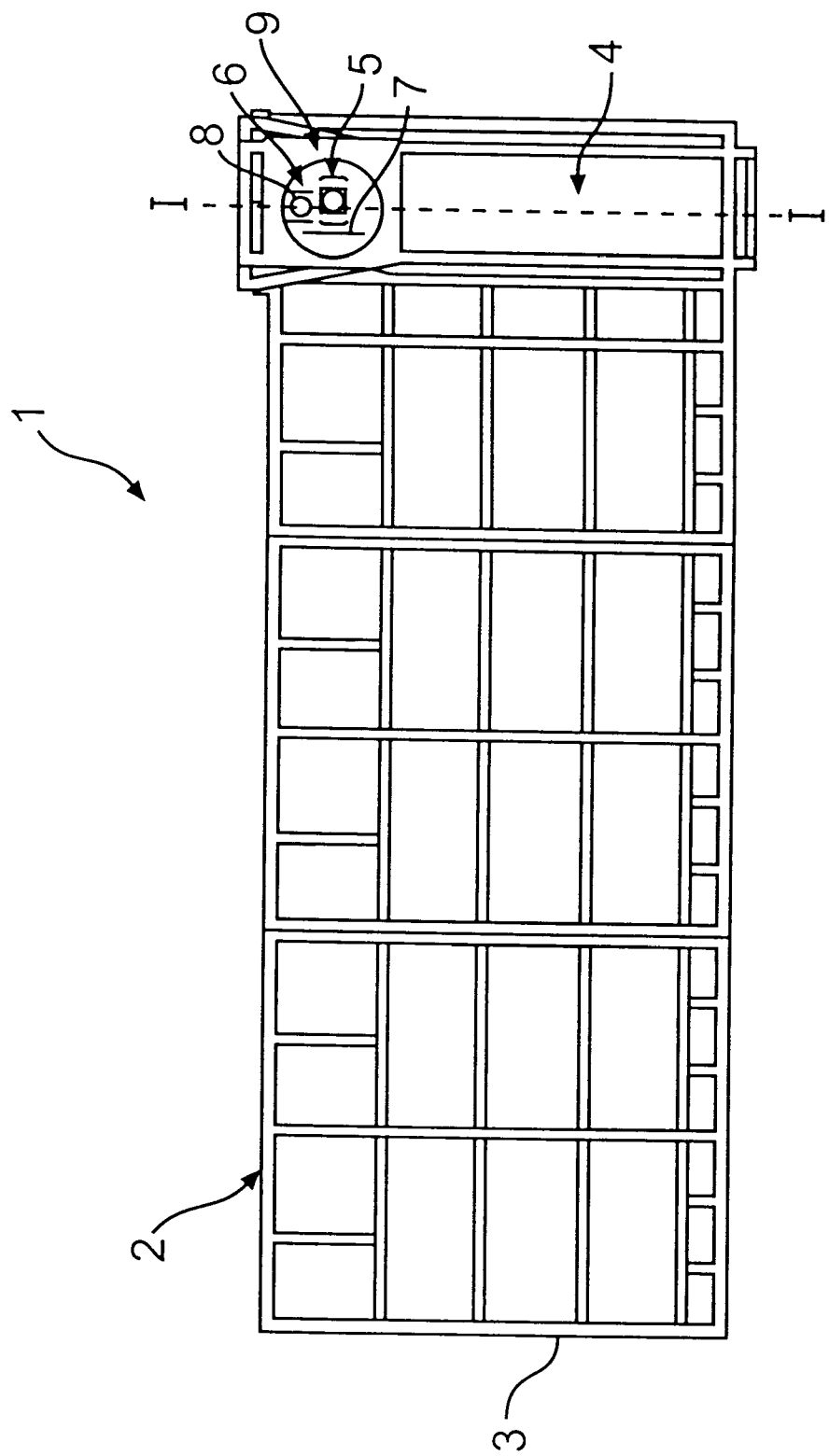
FIG. 1 is a plan view illustrating a device in accordance with the invention.

The device 1 for machining panels as illustrated in the plan view as shown in FIG. 1 comprises a supporting frame 2 with a mounting frame 3. In this arrangement the device 1 may, for example, have a length of approx. 9 m and a width of approx. 4 m, so that panels having corresponding dimensions can be machined.

Also illustrated in FIG. 1 is a translation frame 4 which can be moved in a longitudinal direction along the supporting frame 2 or mounting frame 3. Arranged on the translation frame 4 is a combination sawing device 5 and shaping device 6 forming together a device for cutting the panels to size. The sawing device 5 comprises a sawing tool 7 and the shaping device 6 comprises a shaping tool 8 indicated schematically in FIG. 1. Due to the selected arrangement, the sawing device 5 and the shaping device 6 can be moved in a path parallel to the x-y plane defined by the mounting frame 3 or by the panel surface. Therefore, each point in the x-y plane of the panel can be machined.

The sawing device 5 and the shaping device 6 are arranged on a carousel 9. The configuration and functioning are explained with reference to FIG. 3.

Further salient parts of the device 1, not directly evident from FIG. 1, are detailed with reference to FIG. 2.

As already described, the device 1 comprises a supporting structure in the form of a supporting frame 2 which can be placed on the floor with the aid of feet (not identified in the figure). Configured on the supporting frame 2 is a mounting frame 3. A translation frame 4 is provided at a height of, for example, 60 cm above floor level. The translation frame 4 is capable of being moved along the longitudinal side of the supporting frame 2 (i.e. perpendicular to the plane of the drawing). Arranged on the translation frame 4 is a sawing device 5 incorporating a sawing tool 7 in combination with a shaping device 6 incorporating a shaping tool 8 (not shown in FIG. 2). As shown in FIG. 2 the shaping device 6 including the shaping tool 8 is covered by the sawing tool 7 and a component to be described below. Sawing device 5 and shaping device 6 can be likewise moved in the longitudinal direction of the translation frame 4 so that each portion of the panel arranged in the x-y plane can be machined by the tools of both the sawing device 5 and the shaping device 6.

Figure 2:
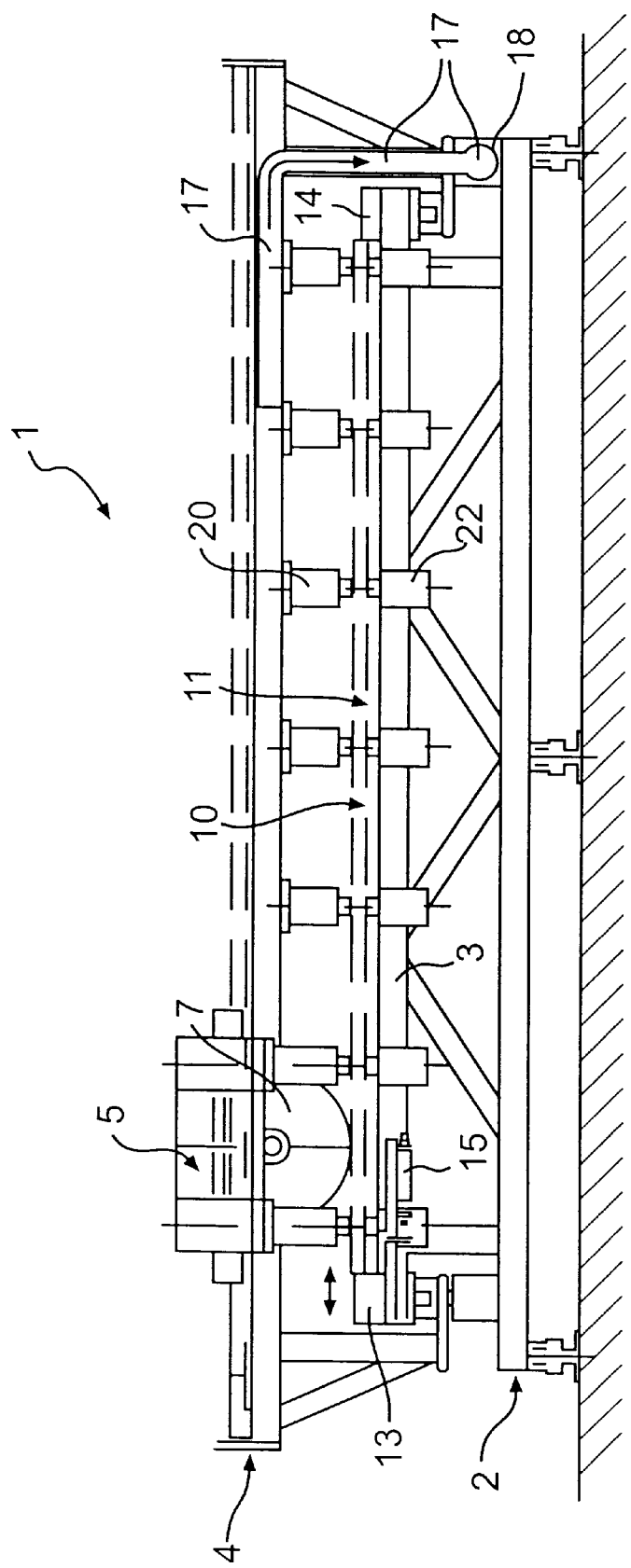
FIG. 2 is a sectional view along line I—I of the device depicted in FIG. 1.

To assist explaining the design and function of the device 1 in more detail, a panel 10 to be machined is indicated by broken lines in FIG. 2. Between this panel 10 to be machined and the mounting frame 3, a base panel is provided as mount 11. Panel 10 rests squarely on the rear side of mount 11. Mount 11 could be a panel of wood-based material acting as a wear panel.

FIG. 2 shows a locating means (having no reference numeral) for the panel 10 which comprises a clamping beam 13 on one (longitudinal) side of the panel 10 and a stop 14 on the opposite (longitudinal) side of the panel. Configured on the clamping beam 13 is an upsweep (not identified) in contact with the corresponding side surface area of the panel 10. The clamping beam 13 may extend substantially over the full length of the panel 10 or also consist of individual sections. The clamping beam 13 or the individual sections are moved with the aid of one or more preferably pneumatic cylinders 15 positioned on a side surface area of the panel 10 to maintain the panel 10 in the defined location.

Furthermore, FIG. 2 depicts a suction exhaust means (having no reference numeral) for drawing off machining debris such as chips or dust. The suction exhaust conduit 17 (or suction exhaust passage) is formed in the interior of the translation frame 4 as well as within a design element 18 of the supporting frame 2. The design element 18 may be a hollow beam of a frame. The direction of suction exhaust is indicated by the arrow in FIG. 2. More particularly, the transfer of the debris from the translation frame 4 into the design element 18 of the supporting frame 2, are given in the background description and illustrated (but not in detail) in FIG. 2.

Furthermore, FIG. 2 also depicts a row of pin-type elements 20 reversibly extensible vertically in the direction of the panel 10 on the underside of the translation frame 4. These pin-type elements 20 form a means for ejecting the panel or the cut-outs obtained from machining on completion thereof.

FIG. 2 also depicts pin-type elements 22 arranged optionally in number and array. More particularly, pin-type elements 22 are positioned on a regular center spacing on the mounting frame 3. These pin-type elements 22 are reversibly extensible vertically in the direction of the panel 10 from underneath. Recesses are located at corresponding locations in the base panel serving as the mount 11. These pin-type elements 22 serve as means for lifting or ejecting the panel on completion of machining.

Figure 3:
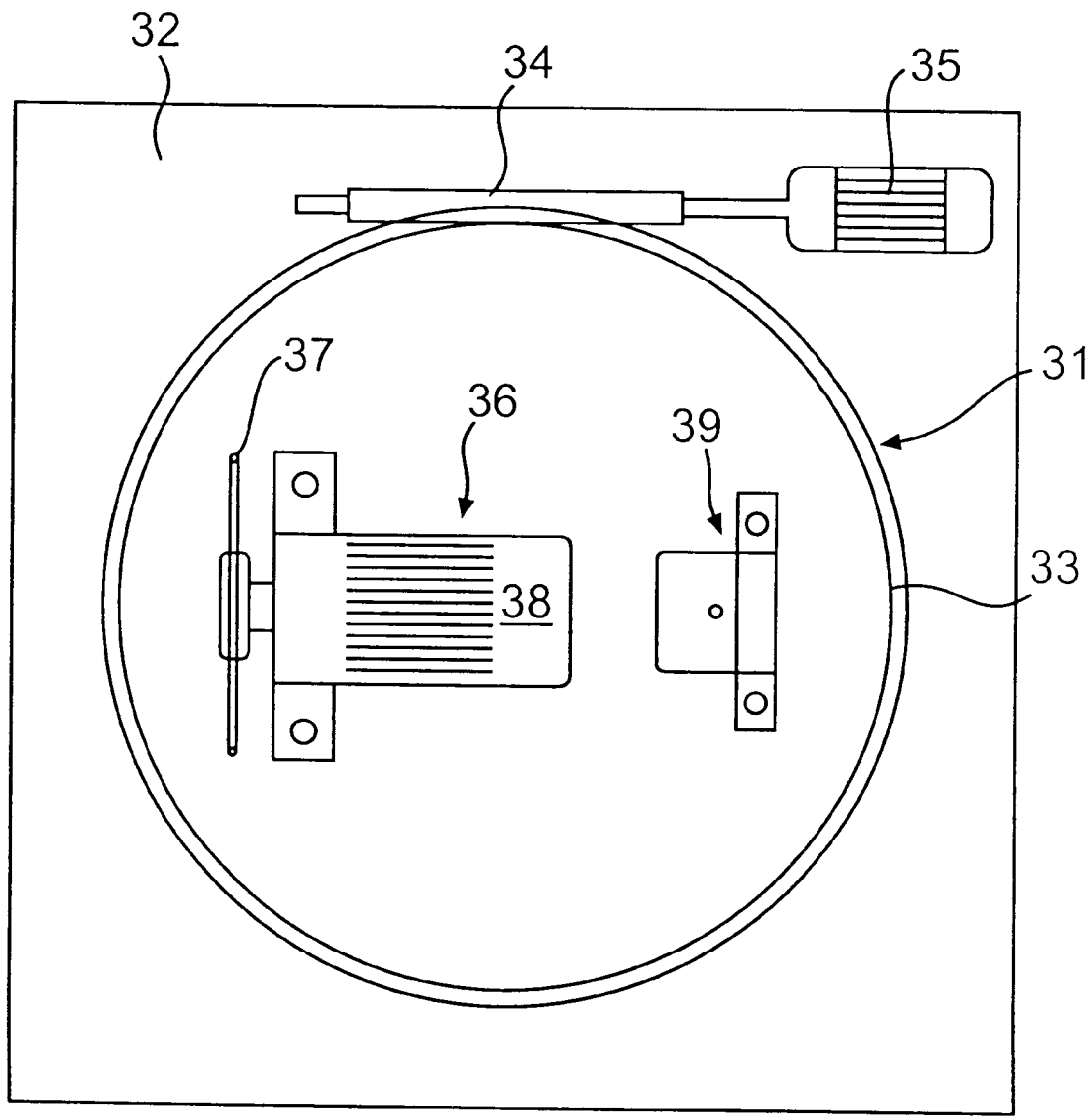
FIG. 3 is a plan view illustrating a carousel carrying a sawing device and a shaping device.

FIG. 3 is a schematic plan view of a slightly modified variation of the carousel identified by the reference numeral 9 in FIG. 1.

The carousel identified by the reference numeral 31 in FIG. 3 which in this case has a diameter of 60 cm, is arranged on a base panel 32. The outer circumference of the carousel 31 is configured as a kind of gear or worm wheel 33 meshing with a corresponding gear or worm shaft 34. The stationary worm shaft 34 can be powered with the aid of a motor 35. Due to the arrangement as described, rotatable movement of the carousel 31 is made possible, preferably in a plane parallel to the x-y plane of the panel to be machined.

Arranged on the carousel 31 is a sawing device 36 and sawing tool 37 along with a motor 38 as well as a shaping device 39 (where necessary also including a drilling device). For reasons of space availability the devices 36 and 39 are suitably spaced away from each other so that the corresponding center of gravity of the two devices can be spaced away from the center point of the carousel 31 equally in each case for stability.

Due to the selected arrangement, the carousel 31 and the sawing and/or shaping tools can be swivelled about a maximum angle of 360°. As a result when employing a saw, such as a circular saw, all possible cutting angles are possible.

As a result of this arrangement the device in accordance with the invention covers the x direction by the locating means of the translation frame and the y direction by the movement of the carousel with its base panel along the translation frame. In this arrangement, moving the carousel along the translation frame in the y direction can be done with the aid of motor-powered ball screws. Swivelling the machining tools is done as described by rotating the carousel. In conclusion, both the sawing tool and the shaping tool can be tilted by ways and means as described, typically an angle of tilt being possible between 0° and 45°, thus making miter cuts possible. In this arrangement, tilting can be achieved for example with the aid of motor-powered ball screws illustrated as inner circled rectangles in FIG. 3 at the top and bottom of the devices 36 and 39 in each case.

The method of operation of a device for machining panels as illustrated in FIGS. 1 to 3 will now be described.

To start with, a panel 10 to be machined is placed on the mounting frame 3 or on a mount 11 provided thereon. The translation frame 4 along with the sawing device 5 and the shaping device 6 are located preferably at one of the two outer positions of the mounting frame 3 or are moved to one of these positions. Subsequently, the panel 10 is located in a defined position with the aid of the locating means. After this the cuts as intended are implemented (i.e. window, door or other cut-outs are formed and/or the side surface areas of the panel 10 cut). The chips or dust resulting from machining are suctioned off with the aid of the suction exhaust means as described.

After the locating means has been released, the pins 22 on the mounting frame 3 are extended through the base panel serving as the mount 11. Next the machining panel 10 is lifted out of place. Only the pins 22 not assigned to any cut-outs or waste pieces are actuated. When the machining panel 10 is lifted out of place, it is separated from the cut-outs and waste pieces, so that the cut-outs and waste pieces remain resting on the mount 11. Subsequently, the translation frame 4 is moved to the side of the device 1 opposite the exit side for the machined panel 10. In this arrangement the translation frame 4 is moved beyond the corresponding dimensions of the panel 10. It is then that the pins 20 located on the underside of the translation frame 4 are extended just above the surface of the mount 11. The translation frame 4 is then moved in the exit direction. The panel 10 is therefore moved out of the device 1 by the extended pins 20.

In conclusion the cut-outs and the waste pieces can be removed manually or automatically. For example pins 20 can be used as described above. A further means could also be used. The further means could project from the underside of the translation frame to push out all cut-outs and waste pieces from the device 1. For example, during the return movement following the exit movement, a beam-type element could be extended in a direction away from the mounting frame.

The device 1 would then be ready for machining the next panel. As already described, the device may be programmed to operate automatically. More particularly, the total sequence is run by a computer implementing a CAD program to control the individual machining steps, the actuating and the locating means, the suction exhaust means and the means for exiting the panel and/or cut-outs or for lifting or ejecting the panel after machining.

The invention thus being described, it will be obvious that the same may be varied in many ways. Other variations are not to be regarded as a departure from the spirit and scope of the invention and all such modifications are intended to be included within the scope of the claims.

What is claimed is:

1. A device for machining panels in a substantially horizontal position comprising:
   a carousel for mounting machining tools wherein said carousel is capable of being rotated and tilted;
   a sawing device mountable to said carousel wherein said sawing device comprises at least one sawing tool; and
   a shaping device mountable to said carousel wherein said shaping device comprises at least one shaping tool.

2. A device as claimed in claim 1, further comprising:
   a worm wheel surrounding said carousel;
   a worm shaft connected to said worm wheel; and
   a motor connected to said worm shaft wherein said rotatable position of said carousel is determined by said motor driving said worm shaft which engages said worm wheel so as to rotate said carousel.

3. A device as claimed in claim 1, wherein the panels are cut to size by said sawing device or said shaping device.

4. A device as claimed in claim 1, wherein movement of said sawing device or said shaping device is controlled by a computer.

5. A device as claimed in claim 4, wherein said computer is programmed using a Computer Aided Design (CAD) Program to control said movement of said sawing device or said shaping device.

6. A device as claimed in claim 4, wherein said movement of said sawing device or said shaping device is defined by a system of coordinates with the first direction parallel to said panel being defined as an x direction, the second direction parallel to said panel and perpendicular to said x direction being defined as a y direction, and a third direction perpendicular to said panel being defined as a z direction; dictated by: a starting point of a cutting line which is an A parameter defined in said x direction and said y direction; an ending point of said cutting line which is an E parameter defined in said x direction and said y direction; and a point normal to said panel which is a Z parameter defined in said x direction, said y direction, and said z direction.

7. A device as claimed in claim 6, wherein said sawing device or said shaping device is movable in accordance with a T parameter which is defined as a cutting depth perpendicular to said cutting line.

8. A device as claimed in claim 1 further comprising a translation frame parallel to an xy plane defined by said panel wherein said sawing device or shaping device is capable of being moved along said translation frame parallel to said xy plane defined by said panel.

9. A device as claimed in claim 8 further comprising:
   a supporting frame;
   a mounting frame connected to said supporting frame and defining a mounting surface;
   said translation frame being connected to said supporting frame and being capable of being moved along said supporting frame.

10. A device as claimed in claim 9 wherein said mounting surface comprises plurality of line-type mounting elements.

11. A device as claimed in claim 9 wherein said mounting surface further comprises mounting elements for remounting panels having a large surface area squarely on said mounting surface.

12. A device as claimed in claim 9 wherein said mounting surface further comprises recesses for lifting and ejecting said panel to be machined.

13. A device as claimed in claim 9 further comprising a locating means for maintaining said panel in a fixed position.

14. A device as claimed in claim 13 wherein said locating means further comprises a clamping beam extending along said mounting frame and capable of being moved in order to secure said panel.

15. A device as claimed in claim 14 wherein said locating means further comprises a stop located across from said clamping beam for securing said panel.

16. A device as claimed in claim 9 further comprising a suction exhaust means for removing machining debris produced during panel machining.

17. A device as claimed in claim 16 wherein said suction exhaust means is integrated within said translation frame and said supporting frame.

18. A device as claimed in claim 17 further comprising a tubular adapter having a flattened rectangle cross-section being connected to said suction exhaust means between said translation frame and said supporting frame.

19. A device as claimed in claim 17 further comprising:
 a tubular-type design element having a passage and being integrated to said supporting frame and extending at right angles with respect to said translation frame; and
 a tubular adapter connected to said tubular-type design element capable of moving within said passage.

20. A device as claimed in claim 18 further comprising a sealing element located between said translation frame and said supporting frame wherein said sealing element minimizes bleed from said exhaust means between the translation frame and the supporting frame.

21. A device as claimed in claim 20 wherein said sealing element is a lip type sealing element.

22. A device as claimed in claim 9 further comprising an extracting means for extracting said panels from said device after machining said panel.

23. A device as claimed in claim 22 wherein said extracting means are pin-type elements which are capable of being moved in a vertical in order to extract said panel from said device.

24. A device as claimed in claim 22 wherein said extracting means are a row of pin-type elements located along said translation frame on a regular center spacing.

25. A device as claimed in claim 22 wherein said extracting means lifts said panel in an upward direction in order to extract said panel.

26. A device as claimed in claim 25 wherein said extracting means is a plurality of pin-type elements capable of extending in a vertical direction relative to a panel to be machined.

27. A device as claimed in claim 25 wherein said extracting means are located along said supporting frame or said mounting frame and are capable of extending through an xy plane of said mounting frame.

* * * * *